US 8,330,823 B2

(12) United States Patent
Gordon (10) Patent No.: US 8,330,823 B2
(45) Date of Patent: Dec. 11, 2012

(54) CAPTURING SURFACE IN MOTION PICTURE

(75) Inventor: Demian Gordon, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 266 days.

(21) Appl. No.: 11/850,546

(22) Filed: Sep. 5, 2007

(65) Prior Publication Data
US 2008/0100622 A1    May 1, 2008

Related U.S. Application Data

(60) Provisional application No. 60/856,199, filed on Nov. 1, 2006.

(51) Int. Cl.
H04N 5/228 (2006.01)
G06T 15/10 (2011.01)

(52) U.S. Cl. .................... 348/208.14; 345/427

(58) Field of Classification Search .................. 348/162, 348/207.99, 370–371
See application file for complete search history.

(56) References Cited

U.S. PATENT DOCUMENTS

| | | | | |
|---|---|---|---|---|
| 5,235,416 A * | 8/1993 | Stanhope | ......................... | 348/77 |
| 6,020,892 A * | 2/2000 | Dillon | ............................ | 345/419 |
| 6,069,631 A * | 5/2000 | Tao et al. | ....................... | 345/418 |
| 6,072,496 A * | 6/2000 | Guenter et al. | ............... | 345/419 |
| 6,487,516 B1 * | 11/2002 | Amorai-Moriya | ............ | 702/152 |
| 6,522,332 B1 * | 2/2003 | Lanciault et al. | ............. | 345/473 |
| 6,592,465 B2 * | 7/2003 | Lutz et al. | ...................... | 473/198 |
| 6,633,294 B1 * | 10/2003 | Rosenthal et al. | ............ | 345/474 |
| 7,027,054 B1 | 4/2006 | Cheiky et al. | | |
| 7,068,277 B2 * | 6/2006 | Menache | ........................ | 345/473 |
| 7,667,767 B2 * | 2/2010 | Perlman | ......................... | 348/371 |
| 2003/0016368 A1 * | 1/2003 | Aman et al. | ................... | 356/615 |
| 2003/0095186 A1 * | 5/2003 | Aman et al. | ................... | 348/162 |
| 2004/0028258 A1 * | 2/2004 | Naimark et al. | ............... | 382/103 |
| 2004/0155962 A1 * | 8/2004 | Marks | ............................ | 348/169 |
| 2004/0179008 A1 * | 9/2004 | Gordon et al. | ................ | 345/419 |
| 2004/0179013 A1 * | 9/2004 | Menache | ........................ | 345/473 |

(Continued)

FOREIGN PATENT DOCUMENTS

| | | |
|---|---|---|
| JP | 10-336680 | 12/1998 |
| JP | 2002-517859 A | 6/2002 |
| WO | 2006/098770 A2 | 9/2006 |

OTHER PUBLICATIONS

Guenter et al., "Making Faces", International Conference on Computer Graphics and Interactive Techniques, Proceedings of the 25th annual conference on Computer graphics and interactive techniques, pp. 55-66, 1998.*

(Continued)

*Primary Examiner* — Luong T Nguyen
(74) *Attorney, Agent, or Firm* — Samuel S. Lee; Procopio, Cory, Hargreaves & Savitch LLP (57) ABSTRACT

Capturing a surface in motion picture, including: covering a surface with a pattern formed of a marking material; acquiring a sequence of image frames, each image frame of the sequence including a plurality of images of the pattern covering the surface; deriving a mesh object from the plurality of images for the each image frame; tracking the mesh object in each frame through the sequence of frames; and generating animation data modeling a characteristic of the surface using the tracked mesh object.

22 Claims, 6 Drawing Sheets

U.S. PATENT DOCUMENTS

| | | | | |
|---|---|---|---|---|
| 2005/0105772 | A1* | 5/2005 | Voronka et al. | 382/103 |
| 2006/0055699 | A1* | 3/2006 | Perlman et al. | 345/473 |
| 2006/0055706 | A1* | 3/2006 | Perlman et al. | 345/589 |
| 2006/0061680 | A1* | 3/2006 | Madhavan et al. | 348/370 |
| 2006/0126928 | A1* | 6/2006 | Edwards et al. | 382/154 |
| 2006/0192785 | A1* | 8/2006 | Marschner et al. | 345/473 |
| 2006/0203096 | A1* | 9/2006 | LaSalle et al. | 348/208.14 |
| 2007/0091178 | A1* | 4/2007 | Cotter et al. | 348/159 |
| 2007/0279494 | A1* | 12/2007 | Aman et al. | 348/169 |

OTHER PUBLICATIONS

Radovan et al.,"Facial animation in a nutshell: past, present and future", Proceedings of the 2006 annual research conference of the South African institute of computer scientists and information technologists on IT research in developing couuntries, p. 71-79, Oct. 9-11, 2006, Somerset West, South Africa.*

Chuang and Bregler, Performance driven facial animation using blendshape interpolation, Computer Science Department, Stanford University.*

Wang et al., "Assembling an expressive facial animation system", ACM Siggraph Video Game Symposium, Proceedings of the 2007 ACM SIGGRAPH symposium on Video games, pp. 21-26, 2007.*

International Search Report/Written Opinion issued in PCT/US07/83360 dated May 9, 2008.

* cited by examiner

CAPTURING SURFACE IN MOTION PICTURE

CROSS-REFERENCE TO RELATED APPLICATIONS

This application claims the benefit of priority pursuant to 35 U.S.C. §119 of U.S. Provisional Patent Application No. 60/856,199, filed Nov. 1, 2006, entitled "Capturing Surface in Motion Picture," the disclosure of which is hereby incorporated by reference.

This application further incorporates by reference the disclosures of commonly assigned U.S. Pat. No. 7,068,277, filed May 23, 2003, entitled "System and Method for Animating a Digital Facial Model"; U.S. patent application Ser. No. 10/427,114, filed May 1, 2003, entitled "System and Method for Capturing Facial and Body Motion"; U.S. patent application Ser. No. 11/467,503, filed Aug. 25, 2006, entitled "Labeling Used in Motion Capture"; and U.S. patent application Ser. No. 11/829,711, filed Jul. 27, 2007, entitled "FACS Cleaning in Motion Capture."

BACKGROUND

The present invention relates generally to motion capture, and more particularly to capturing surface using motion marker data.

Motion capture systems are used to capture the movement of a real object and map it onto a computer-generated object as a way of animating it. These systems are often used in the production of motion pictures and video games for creating a digital representation of an object or person that is used as source data to create a computer graphics ("CG") animation. In a typical system, an actor wears a suit having markers attached at various locations (e.g., small reflective markers are attached to the body and limbs). Appropriately placed digital cameras then record the actor's body movements in a capture volume from different angles while the markers are illuminated. The system later analyzes the images to determine the locations (e.g., spatial coordinates) and orientations of the markers on the actor's suit in each frame. By tracking the locations of the markers, the system creates a spatial representation of the markers over time and builds a digital representation of the actor in motion. The motion is then applied to a digital model in virtual space, which may be textured and rendered to produce a complete CG representation of the actor and/or the performance. This technique has been used by special effects companies to produce realistic animations in many popular movies.

However, limitations exist in motion capture systems. In particular, data derived from a motion capture session typically capture the movements of a rigid object, such as an extremity of an actor's body. For example, markers placed on an actor's forearm are used to develop data describing the motion of the forearm as a rigid object, connected to a hand and to an upper arm. The motion is therefore akin to that of a stick or rod, once the data have been processed. Hence, these data are sometimes referred to as a "skeleton" of the actor. However, missing are data describing the shape of the forearm, such as the tapering from elbow to wrist, and the cross-sectional contours at the different positions along the forearm.

SUMMARY

Certain implementations as disclosed herein provide for methods, systems, and computer programs for capturing a surface in a motion picture.

In one aspect, a method as disclosed herein provides for capturing a surface in motion picture. The method includes: covering a surface with a pattern formed of a marking material; acquiring a sequence of image frames, each image frame of the sequence including a plurality of images of the pattern covering the surface; deriving a mesh object from the plurality of images for each image frame; tracking the mesh object in each frame through the sequence of frames; and generating animation data modeling a characteristic of the surface using the tracked mesh object.

In one implementation, the marking material conforms to the surface. In another implementation, the mesh object models the surface. In another implementation, the animation data include labeled marker data in the form of at least one of skeleton data, FACS animation curves, and shape animation.

In another aspect, a method comprises: obtaining a 3-D model of an actor's head; unwrapping the 3-D model into a 2-D texture; replacing the details of the actor's facial features represented in the 2-D texture with a known pattern; printing the 2-D texture with the known pattern onto a flexible material; applying the flexible material to the actor's face; acquiring a sequence of image frames, each image frame of the sequence including a plurality of images of the known pattern covering the actor's face; and deriving a mesh object representing the actor's face using the image frames.

In another aspect, a system for capturing a surface in motion picture is disclosed. The system includes: an image acquisition module configured to generate a sequence of image frames, each image frame including a plurality of synchronized images of a pattern disposed on a surface; and a surface capture module configured to receive the sequence of image frames and generate animation data based on the pattern disposed on the surface.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Conventionally, discrete markers are attached to an actor or object and a plurality of motion capture cameras record the movement of the markers. Based on the recorded movement of the markers, a model of the motion of the actor or object is derived and is used to create a graphical representation of the motion.

According to implementations of the present invention, known patterns of marking material are applied, substantially covering the entire surface of the actor and/or object. Shape, texture, and lighting effects of and relating to the actor and/or object are captured in addition to motion by recording and digitizing images of the patterns. The known and unknown patterns thus applied are generated, for example, using materials including quantum nano dots, glow-in-the dark (fluorescent) material, and virtually any visible, infra-red, or ultra-violet ink, paint, or material which can be applied in a sufficiently known or random pattern.

In one implementation, shape, texture, light, and movement of an actor's face, body, hands, and other extremities are captured. In another implementation, shape, texture, light, and movement of sets and props in the capture volume are captured. In a further implementation, a supplementary light-dark marker approach provides capture of a texture in both light and dark frames. Alternatively, there may be light markers (e.g., reflective markers or active lights) which are applied as either discrete markers or as a visible pattern in conjunction with known or random patterns of glow-in-the-dark marker material.

Thus, by applying known and/or random patterns to actors and/or objects and then recording their movements with cameras, it is possible to capture not only motion, but geometry (e.g., shape, texture, or lighting, etc.). The captured pattern is reconstructed as a mesh object per each frame of recorded images.

An automated feature tracker can be applied to mesh objects derived for a sequence of frames. In one implementation, a feature tracker uses a combination of topographical recognition, texture tracking, kinematic skeletons, and facial action coding system ("FACS") cleaning to generate continuous and consistently labeled point data. Further, the point data can be resolved to skeleton data, FACS animation curves, or shape animations as the final output from all objects in a captured scene.

Skeleton data animate characters and objects so that characters and objects move in the same way as the originals, including actors. Once the "character-object" is animated, differences in shape between the "character-object" and the "actor-object" are determined. Details missing in the skeleton data, but present in the mesh per frame object, are extracted and applied to the character model.

The mesh object data can also be used to extract deformation information as guidelines for simulations (such as for cloth, hair, or skin jiggling) during post-processing, and can be used to ensure that the skeleton data closely match the mesh per frame objects. The skeleton data can be difficult to quantify because only the movements of the markers are recorded, and thus the characteristics of the original object are lost in conventional motion capture.

The character texture and lighting can be compared to the lighting embedded in the texture that was recorded for the "actor-object" at the time of capture. Interesting shadow or lighting characteristics are extracted and replicated in the character texture and lighting by using similar approaches to the ones used for approximating lighting using a light probe.

In another implementation, a method includes obtaining a 3-D model of an actor's head, unwrapping the 3-D model into a 2-D texture, replacing the details of the actor's facial features represented in the 2-D texture with a known pattern, printing the 2-D texture with the known pattern onto a flexible material, applying the flexible material to the actor's face, acquiring a sequence of image frames, each image frame of the sequence including a plurality of images of the known pattern covering the actor's face, and deriving a mesh object representing the actor's face using the image frames.

Figure 1:
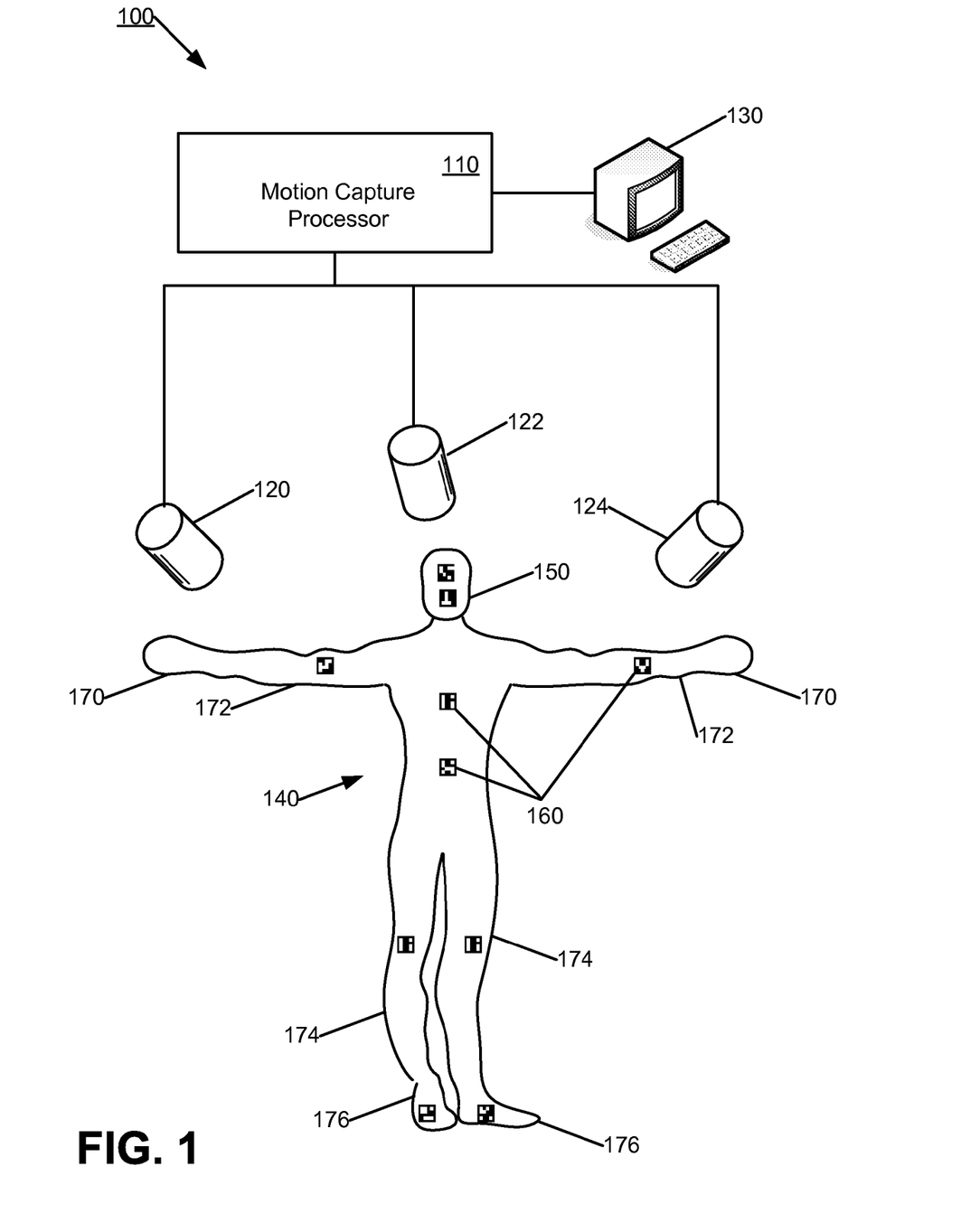
FIG. 1 is a block diagram of a motion capture system in accordance with one implementation.

FIG. 1 is a block diagram of a motion capture system 100 in accordance with one implementation. The motion capture system 100 includes a motion capture processor 110, motion capture cameras 120, 122, 124, a user workstation 130, and an actor's body 140 and face 150 substantially covered with marker material 160 in a predetermined pattern. Although FIG. 1 shows only ten markers, substantially more markers can be used on the body 140 and face 150. The motion capture processor 110 is connected to the workstation 130 by wire or wirelessly. The motion capture processor 110 is typically configured to receive control data packets from the workstation 130.

Connected to the motion capture processor 110 are three motion capture cameras 120, 122, 124, though generally more than three motion capture cameras are used according to a variety of user- and animation-related needs and requirements. The motion capture cameras 120, 122, 124 are focused on the actor's body 140 and face 150, on which marker material 160 has been applied. The placement of the marker material is configured to capture motions of interest including, for example, the body 140, face 150, hands 170, arms 172, legs 174, and feet 176 of the actor.

The motion capture cameras 120, 122, 124 are controlled by the motion capture processor 110 to capture frame-by-frame two-dimensional ("2-D") images of the markers. The images are captured in image frames, where each image frame represents one of a temporal sequence of image frames. Each individual image frame comprises a plurality of 2-D images, each 2-D image individually generated by one motion capture camera 120, 122, or 124. The 2-D images thus captured are typically stored, or viewed in real-time at the user workstation 130, or both.

The motion capture processor 110 integrates (i.e., performs a "reconstruction") of the 2-D images to generate a volumetric frame sequence of three-dimensional ("3-D") marker data. This sequence of volumetric frames is often referred to as a "beat," which can also be thought of as a "shot" or "scene." Conventionally, the markers are discrete objects or visual points. The reconstructed marker data comprise a plurality of discrete marker data points, where each marker data point represents a spatial (i.e., 3-D) position of a marker coupled to a target, such as an actor 140, for example. Each volumetric frame includes a plurality of marker data points representing a spatial model of the target. The motion capture processor 110 retrieves the volumetric frame sequence and performs a tracking function to accurately map the marker data points of each frame with the marker data points of each preceding and following frame in the sequence.

As an example, each individual marker data point in a first volumetric frame corresponds to a single marker placed on an actor's body 140. A unique label is assigned to each such marker data point of the first volumetric frame. The marker data points are then associated with corresponding marker data points in a second volumetric frame, and the unique labels for the marker data points of the first volumetric frame are assigned to the corresponding marker data points of the second volumetric frame. When the labeling (i.e., tracking) process is completed for the volumetric frame sequence, the marker data points of the first volumetric frame are thus traceable through the sequence, resulting in an individual trajectory for each marker data point.

Discrete markers are typically used to capture the motion of rigid objects or segments of an object or body. For example, as discussed above, rigid markers attached at an elbow and a wrist define the positions of the ends of a forearm. When the forearm is moved, the motions of the elbow and wrist markers are tracked and resolved as described above in a sequence of volumetric frames. The motion of the forearm is thus modeled as a rigid body (e.g., a rod) with only the ends defined by the elbow and wrist markers. However, while translational movements of the forearm are easily resolved by analyzing the changes in spatial positions of the elbow and wrist markers, a common twisting motion of the forearm is difficult to detect because a twist can be performed without substantially moving the wrist or elbow.

In one implementation, in contrast to the use of discrete markers, a marker material is used which conforms to and covers the surface onto which it is applied. The marker material further has a pattern amenable to tracking similarly to discrete markers, as discussed above. Because the pattern covers the surface, substantially all, or any part, of the surface may be tracked rather than only discrete points. In one implementation, a surface marked and tracked in this way is reconstructed in each volumetric frame as a mesh object, in which trackable aspects of the pattern are represented by vertices. Each volumetric frame thus includes a system of vertices, the system of vertices comprising a model of the surface on which the marking material is applied. The mesh object is tracked through the sequence of volumetric frames, yielding a virtual animation representing the various spatial translations, rotations, and twists, for example, of the surface.

In one implementation, a marking material is applied to one or more surfaces of an object, such as a stage set or prop used during a performance. A mesh object is reconstructed and vertices of the mesh object are tracked through the sequence of volumetric frames in the same manner as discussed above.

Figure 2:
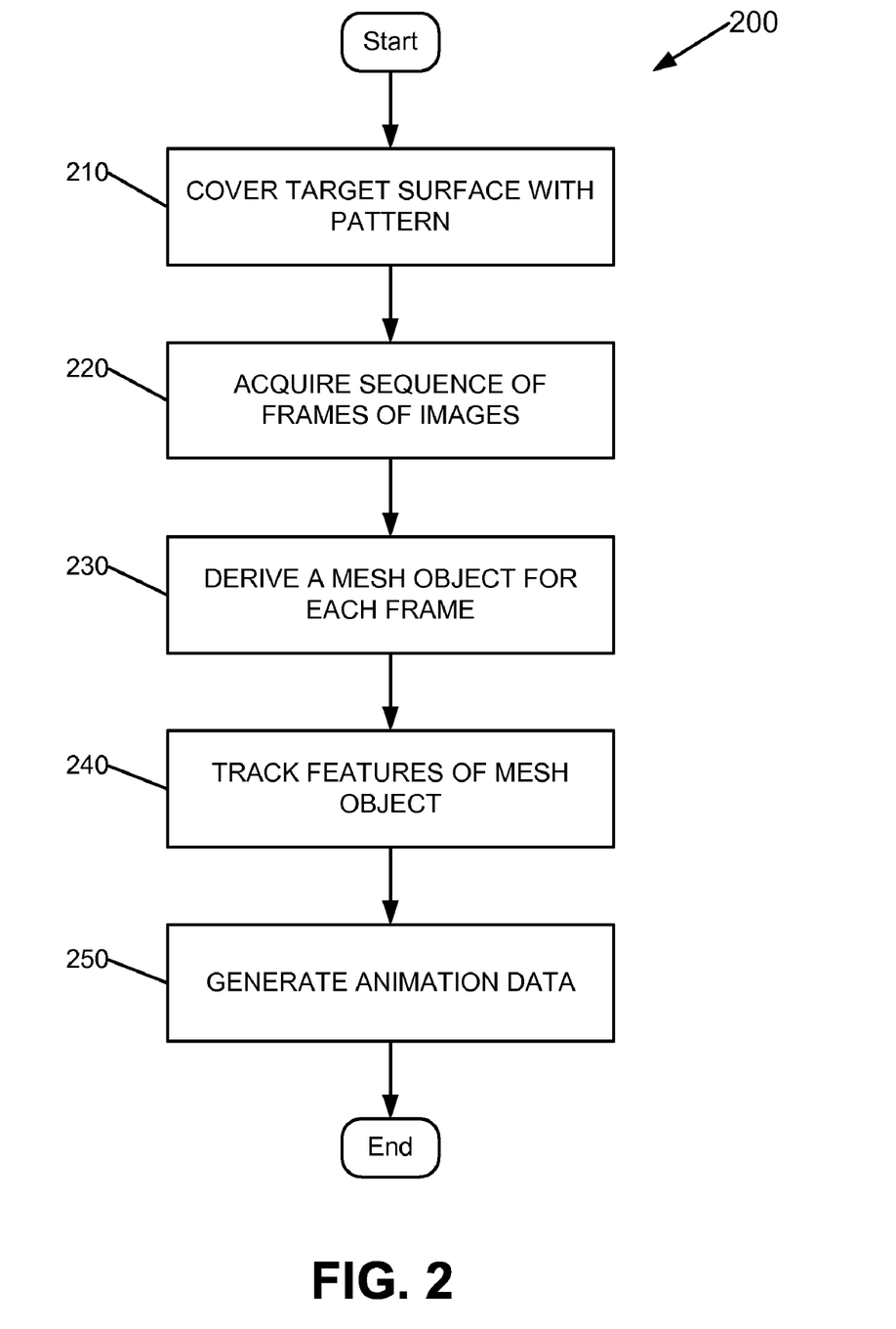
FIG. 2 is a flowchart describing a method of capturing surface in accordance with one implementation.

FIG. 2 is a flowchart describing a method 200 of capturing surface in accordance with one implementation. The method 200 includes covering the surface of a target object with a patterned marking material, at block 210. Typically, the marking material conforms to the surface onto which it is applied. This allows a corresponding mesh object to accurately represent the various aspects of the surface to be developed.

Various techniques for applying marking material onto a surface can be used. Generally, the marking material conforms to the surface.

In one implementation, the marking material is in liquid form, such as paint or ink, and is applied onto the surface in a pattern chosen by an animator or artist. In one example, the marking material is applied as a system of dots onto an actor's body and face, in which the dots are arranged in patterns uniquely identifying the particular part of the body or face. Subsequent mesh object processing is substantially simplified because the unique patterns are readily interpreted during reconstruction and marker tracking. In another example, the marking material is applied to form-shaped markings on the actor's body uniquely identifying various body areas (i.e., right knee, left knee, etc.) to simplify processing. Further, marking materials in liquid form are naturally suited for covering a surface in order to recognize its physical aspects, such as its shape and the various contortions it undergoes during a performance.

Referring to the above example, an actor's forearm is substantially covered by a marking material in liquid form, applied in one or more patterns. A mesh object representing the pattern is then reconstructed in virtual space, capturing not only the shape of the actor's forearm, but also a twisting motion exerted during the actor's performance.

In another implementation, the marking material comprises a cloth or flexible tape which adheres to the surface. Strips of the marking material are fashioned and then applied to areas of interest on the surface. The marking material is applied directly to the surface to create desired patterns. Alternatively, the marking material is fashioned into shapes, including unique and/or random shapes, which are applied on the surface. In another implementation, a cloth-based marking material is formed as a garment onto which the desired patterns are stitched, painted, or stained. For example, a tight-fitting, shape-conforming sleeve configured with distinctive patterns is worn by the actor on a forearm. Integrating motion capture data acquired from performances by the actor stretching over multiple sessions on different days is simplified and made more efficient due to the high level of consistency inherent in use of the same pattern at the same position on the forearm at each performance. Moreover, because a tight-fitting garment conforms closely to the shape of the actor's forearm, patterns on such a garment generate an accurate mesh representation of the forearm.

The patterns configured into, or formed by, the marking material must be discernable from the background in the image frames.

In one implementation, the marking material comprises quantum nano dots, a substance having the property of emitting light at a higher wavelength than the illuminating excitation light. That is, an excitation light at a first wavelength is used to illuminate the quantum nano dot marking material, which in response goes through a quantum shift and emits light at a second wavelength, which is higher than the first wavelength. The illuminating excitation light is filtered out of the acquired images, leaving only the emitted light and thus the images of the patterns formed using the quantum nano dots.

In another implementation, the marker material comprises a reflective material. Bright lights illuminate the material during a performance, thus intensifying the visual presence of the pattern in the acquired images and aiding reconstruction and tracking.

In another implementation, the marker material comprises a fluorescent, glow-in-the dark substance, also referred to as a "dark marker." The images acquired with the use of the dark markers are acquired in a darkened environment, in which only the glowing material is visible. Other dark marker materials include infra-red ("IR") marking materials, used under IR illumination, and ultra-violet ("UV") marking materials used under UV illumination.

In a further implementation, a visible pattern formed of a reflective marking material ("light marker"), for example, is used in conjunction with a dark marker material under alternating light and dark lighting conditions, such as under a bright strobe light.

The patterns applied to the marking material vary according to requirements, for example, of image acquisition, animator/artist preference, and/or the animation product. In one implementation, the pattern is predetermined. Unique patterns are created, as discussed above, and applied to target surfaces typically to map the areas during marker tracking. In another implementation, the pattern is a substantially random pattern. Similar to unique predetermined patterns, the random pattern is beneficial during tracking for its inherent uniqueness among the various locations on the surface to which it is applied.

Referring to FIG. 2, a sequence of frames of images capturing the pattern of marking material is acquired, at block 220. As discussed above, a plurality of motion capture cameras 120, 122, 124 at precise placements about the capture volume synchronously acquire images of the pattern during a performance. Each synchronous iteration of image capture by the plurality of cameras produces a plurality of images referred to as an image frame. A sequence of image frames typically spans the duration of a beat, or performance.

At least one mesh object is then derived, at block 230, for each image frame from the plurality of images synchronously acquired for the image frame. Since it is possible for multiple objects or actors to be involved in a single performance, multiple mesh objects are generated to represent them. The resulting mesh object is represented by vertices defined within a volumetric frame that corresponds to the plurality of image frames.

In one implementation, the pattern incorporated by the marker material includes a plurality of finely dispersed markings. The locations of the markings are determined in each image of the frame, and in conjunction with information as to the spatial placement of the motion capture cameras about the capture volume, the markings are resolved to spatial positions in the capture volume. Each resolved spatial position can be thought of as a marker data point, or more specifically, a vertex of a mesh object representing a model of the surface on which the pattern was applied. Thus, the mesh object substantially captures the shape of the surface. In one implementation, the mesh object also captures a texture of the surface. In another implementation, the mesh object further captures a lighting effect on the surface at the time the image frame was captured. For example, a pattern made of reflective marker material wrapped around an actor's forearm reflects an illuminating point source light to varying degrees depending upon the angle of incidence of the light rays on the forearm surface. Thus, the level of reflection of the illuminating light provides light and shadow information for utilization according to the requirements of the animation.

The mesh objects corresponding to each volumetric frame are then tracked through the sequence of volumetric frames, at block 240. In one implementation, each vertex of the mesh object of a first volumetric frame is associated with the corresponding vertex of the mesh object of another volumetric frame of the sequence. The process is repeated until each vertex is traceable through the sequence of volumetric frames.

Animation data representing a motion model of the pattern, and thus also the surface onto which the pattern is applied, are then generated, at block 250. The animation model includes at least one characteristic of the surface, including the shape, a texture, and a lighting effect, in addition to translational and contortional movements of the surface during the performance. The animation data are applied to a character model, usually a digital model relating to the surface on which the pattern was applied. For example, the animation data derived from the pattern applied to the actor's forearm is used to animate a corresponding forearm of an animated character, or virtually any other object in the animation. For animation data derived from the movements of an actor's face, for example, the animation data include FACS animation curves which are used to trigger virtual muscle groups on the digital facial model corresponding to facial muscle groups of the actor. In one implementation, the animation data include skeleton data for driving the motion of an animated body or body extremity. In another implementation, the animation data include those such as the mesh object vertices of a sequence of volumetric frames used to animate a shape (i.e., shape animation data).

Figure 3:
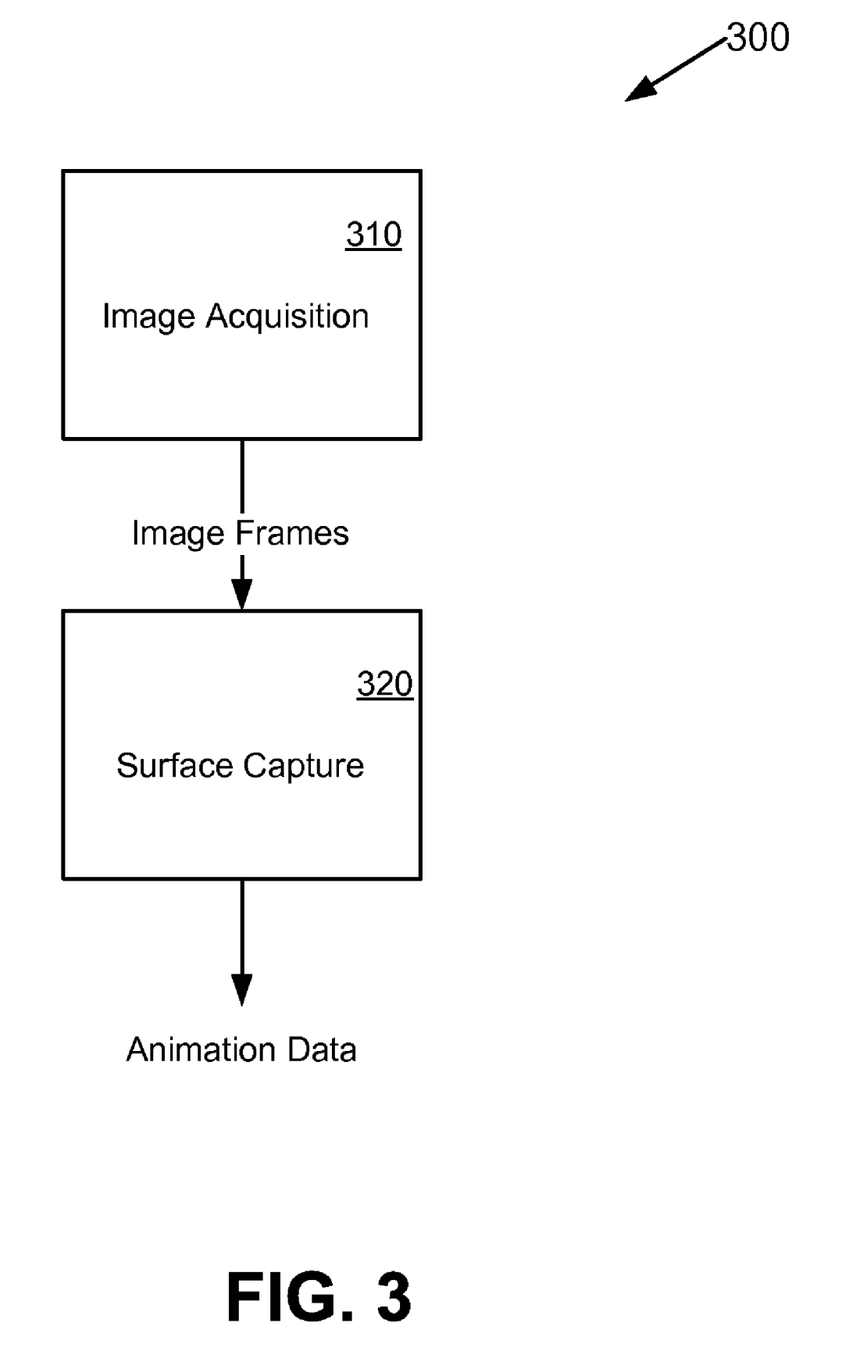
FIG. 3 is a functional block diagram of a surface capture system according to one implementation.

FIG. 3 is a functional block diagram of a surface capture system 300 according to one implementation. The surface capture system 300 includes an image acquisition module 310 and a surface capture module 320.

The image acquisition module 310 includes motion capture cameras 120, 122, 124, a motion capture processor 110, and a user workstation 130 as depicted in FIG. 1. The image acquisition module 310 generates image frames, each image frame including a plurality of 2-D images of at least one pattern of marking material applied to an actor 140, for example, synchronously acquired during a beat by the plurality of motion capture cameras 120, 122, 124. The image frames generated at the image acquisition module 310 typically comprise a sequence of image frames recorded during a beat. The image frames are received at the surface capture module 320, which generates animation data derived from the image frames.

Figure 4:
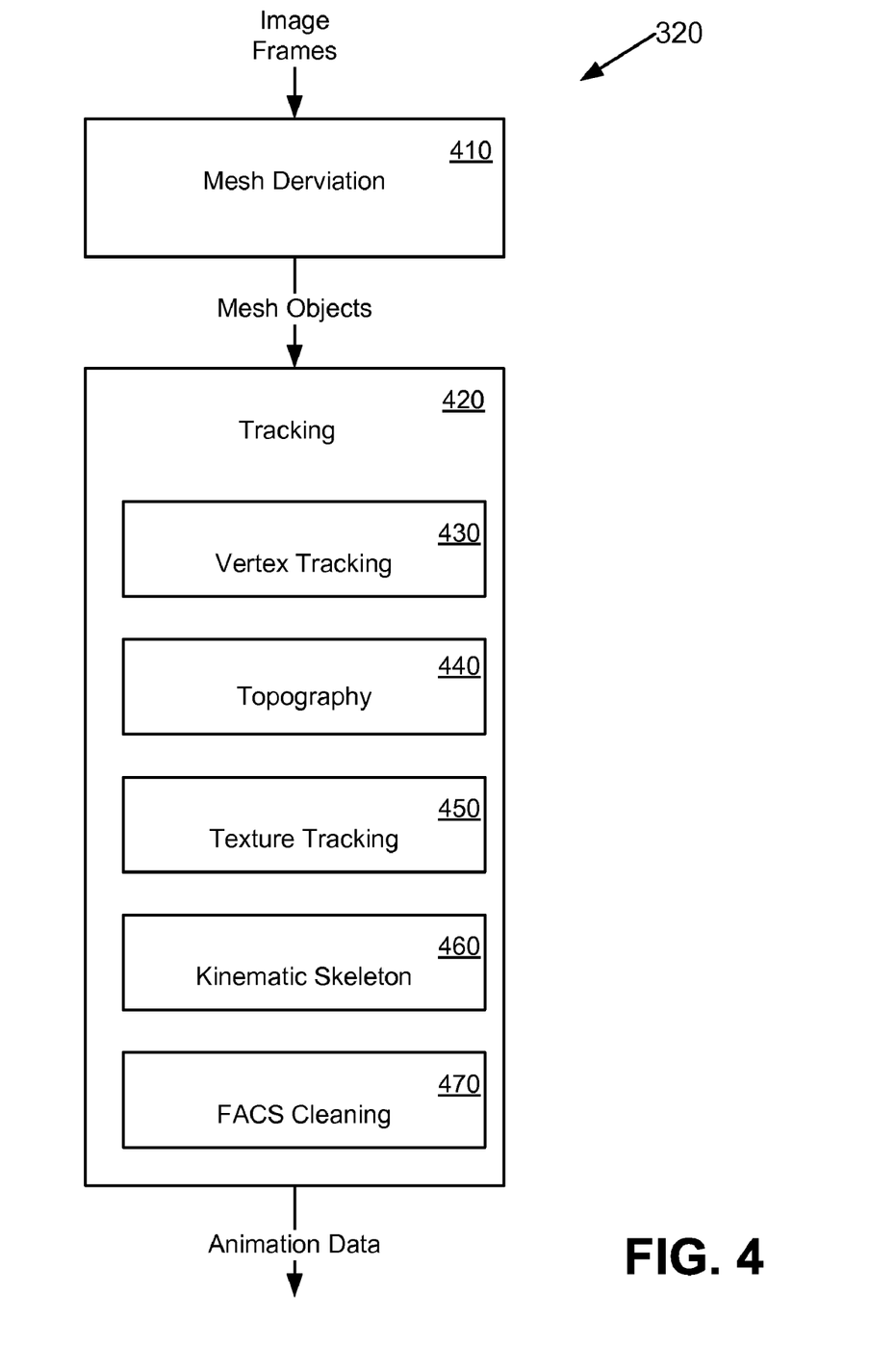
FIG. 4 is a functional block diagram of a surface capture module according to one implementation.

FIG. 4 is a functional block diagram of a surface capture module 320 according to one implementation. As depicted in FIG. 4, the surface capture module 320 includes a mesh derivation module 410 and a tracking module 420. The tracking module 420 further includes a vertex tracking subunit 430, a topography subunit 440, a texture tracking subunit 450, a kinematic skeleton subunit 460, and a FACS cleaning subunit 470.

The mesh derivation module 410 receives image frames and generates mesh objects defined in volumetric frames corresponding to the image frames. Typically, at least one mesh object is derived for each image frame from the plurality of images synchronously acquired for that image frame. The resulting mesh object is represented by vertices defined within a volumetric frame corresponding to the image frame.

The pattern incorporated by the marker material may include a plurality of finely dispersed markings. The markings are located in each image of the image frame, and in conjunction with information as to the spatial placement of the motion capture cameras about the capture volume, the markings are resolved to spatial positions in the capture volume. Each resolved spatial position represents a marker data point, or more specifically, a vertex of a mesh object representing a model for the corresponding frame of the surface on which the pattern was applied. The mesh object captures substantially the shape of the surface. In one implementation, where the surface is sufficiently textured, the mesh object also captures the texture of the surface. In another implementation, the mesh object captures a lighting effect on the surface at the time the image frame was captured. For example, a pattern made of reflective marker material wrapped around an actor's forearm reflects an illuminating point source light to varying degrees depending upon the angle on incidence of the light rays on the forearm surface. Thus, the level of reflection of the illuminating light provides light and shadow information for utilization according to the requirements of the animation.

The mesh objects corresponding to each volumetric frame are received at the tracking module 420 and tracked through the sequence of volumetric frames. In one implementation, each vertex of the mesh object of a first volumetric frame is associated by the vertex tracking subunit 430 with the corresponding vertex of the mesh object of another frame of the sequence. The associations are repeated among the volumetric frames of the sequence until each vertex is traceable through the entire sequence.

The topography subunit 440 can apply topographical recognition functionality to trace one or more topographical characteristics of the mesh object through the sequence of volumetric frames. Tracing a topographical characteristic enhances the tracking accuracy of the vertex tracking subunit 430, and, in one implementation, is used as a sole mesh object tracking technique.

The texture tracking subunit 450 can apply texture recognition functionality to trace one or more textural characteristics represented in the mesh object through the sequence of volumetric frames. Tracing a textural characteristic enhances the tracking accuracy of the vertex tracking subunit 430, and, in one implementation, is used as a sole mesh object tracking technique.

The kinematic skeleton subunit 460 can apply various constraints (i.e., "rules") to the motion of a skeletal element of a body. Skeleton data are derived from the patterns of marker material captured in the image frames. For example, an actor's forearm is modeled by a skeletal element similar to a rod or stick connecting the elbow to the wrist. As discussed above, this approach is effective in capturing translational movements of the forearm, but is insufficient for capturing a contortional movement, such as a twist of the forearm. However, the accuracy of mesh object tracking is improved by constraining the associations of vertices from frame to frame according to rules constraining the movement of the skeletal element defined for the forearm. If one or more candidate vertex labeling assignments between two frames describes an unnatural, improbable, or impossible movement of the forearm as determined by the kinematic skeleton subunit 460, those vertex assignments are scored low in favor of other vertex assignments consistent with "acceptable" movements of the skeletal element according to constraint rules. Applying kinematic skeleton analysis thus enhances the tracking accuracy of the vertex tracking subunit 430.

Generally, a FACS provides a standard taxonomy for systematically categorizing human facial expressions, though it will be appreciated that the scheme is applicable to body movement, for example, as well. Facial movement data representative of various facial expressions are captured using a motion capture system similar to that depicted in FIG. 1, and are categorized according to a FACS.

In one implementation, a "FACS matrix" forms the basis for initial surveys of key facial expressions. An actor is fitted with a pattern implemented with marking material on the face and instructed to perform a range of expressions. Key facial expressions are captured under ideal conditions typically in a small capture volume, where lighting is closely controlled and extraneous movements by the actor are meticulously restricted. Often, the actor is seated or stands motionless, to isolate body movements from facial movements.

The key facial expressions maintained in the FACS matrix are subsequently used like "facial basis vectors" during post-processing. An incoming facial expression generated during an actor's performance is analyzed to determine a weighted combination of the key facial expressions. In one implementation, the FACS matrix is enhanced during post-processing by incorporating additional facial expressions which are not well described on a first pass by a weighted combination. These facial expressions are added as new key facial expressions, thus improving the robustness of the FACS matrix by increasing the range of facial expression (i.e., facial basis vectors) it comprehends.

The facial action coding system ("FACS") cleaning subunit 470 can apply constraint rules to mesh objects representing an actor's face. For example, the vertices of a facial mesh object are analyzed and movements which are not "allowable" according to predefined rules are identified. That is, frame-to-frame spatial displacements (i.e., movements) of the vertices are analyzed according to constraints defined by key facial expressions maintained in a FACS matrix. In one implementation, only allowable facial mesh object vertex movements are returned, thus providing a filtering effect removing noise artifacts in the facial mesh object vertices (e.g., outlier mesh object vertices). Cleaning further includes determining spatial positions which facial mesh object vertices should have occupied in the event that they were occluded during the actor's performance (e.g., where the view of the pattern of marking material on the face is blocked by a prop). FACS cleaning then fills the resulting gaps in the facial mesh object vertex trajectories with vertices conforming to the key facial expressions maintained in the FACS matrix. Thus, gapless, accurately labeled, and noiseless mesh object vertices are generated.

Animation data representing a motion model of the pattern, and thus also the surface onto which the pattern is applied, are generated by the tracking module 420. The motion model includes at least one characteristic of the surface, including the shape, a texture, and a lighting effect, in addition to translational and contortional movements of the surface during the performance. The animation data are applied to a character model, usually a digital model of the surface on which the pattern was applied. For example, the animation data that are derived from the pattern applied to an actor's arm 172 are used to animate a corresponding arm (or possibly some other limb) of an animated character or object. Where the animation data are derived from the movements of an actor's face 150, the animation data are used to trigger virtual muscle groups on the digital facial model corresponding to facial muscle groups of the actor's face 150.

Figure 5A:
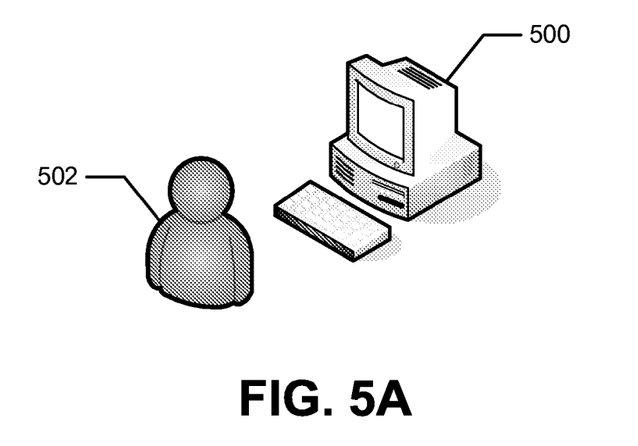
FIG. 5A is a diagram illustrating a user and a computer system.

FIG. 5A illustrates a representation of a computer system 500 and a user 502. The user 502 uses the computer system 500 to perform surface capture. The computer system 500 stores and executes a surface capture system 590, which processes image frame data.

Figure 5B:
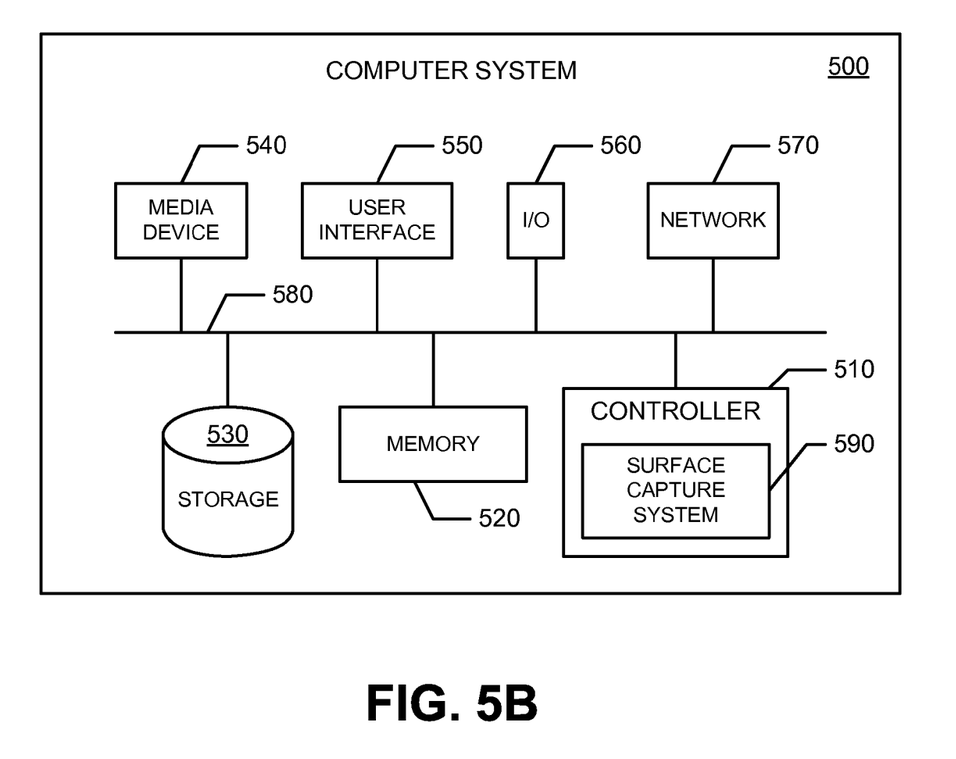
FIG. 5B is a functional block diagram of an example computer system hosting a surface capture system.

FIG. 5B is a functional block diagram illustrating the computer system 500 hosting the surface capture system 590. The controller 510 is a programmable processor and controls the operation of the computer system 500 and its components. The controller 510 loads instructions (e.g., in the form of a computer program) from the memory 520 or an embedded controller memory (not shown) and executes these instructions to control the system. In its execution, the controller 510 provides the surface capture system 590 as a software system. Alternatively, this service can be implemented as separate components in the controller 510 or the computer system 500.

Memory 520 stores data temporarily for use by the other components of the computer system 500. In one implementation, memory 520 is implemented as RAM. In one implementation, memory 520 also includes long-term or permanent memory, such as flash memory and/or ROM.

Storage 530 stores data temporarily or long term for use by other components of the computer system 500, such as for storing data used by the surface capture system 590. In one implementation, storage 530 is a hard disk drive.

The media device 540 receives removable media and reads and/or writes data to the inserted media. In one implementation, for example, the media device 540 is an optical disc drive.

The user interface 550 includes components for accepting user input from the user of the computer system 500 and presenting information to the user. In one implementation, the user interface 550 includes a keyboard, a mouse, audio speakers, and a display. The controller 510 uses input from the user to adjust the operation of the computer system 500.

The I/O interface 560 includes one or more I/O ports to connect to corresponding I/O devices, such as external storage or supplemental devices (e.g., a printer or a PDA). In one implementation, the ports of the I/O interface 560 include ports such as: USB ports, PCMCIA ports, serial ports, and/or parallel ports. In another implementation, the I/O interface 560 includes a wireless interface for communication with external devices wirelessly.

The network interface 570 includes a wired and/or wireless network connection, such as an RJ-45 or "Wi-Fi" interface (including, but not limited to 802.11) supporting an Ethernet connection.

The computer system 500 includes additional hardware and software typical of computer systems (e.g., power, cooling, operating system), though these components are not specifically shown in FIG. 5B for simplicity. In other implementations, different configurations of the computer system can be used (e.g., different bus or storage configurations or a multi-processor configuration).

Figure 6:
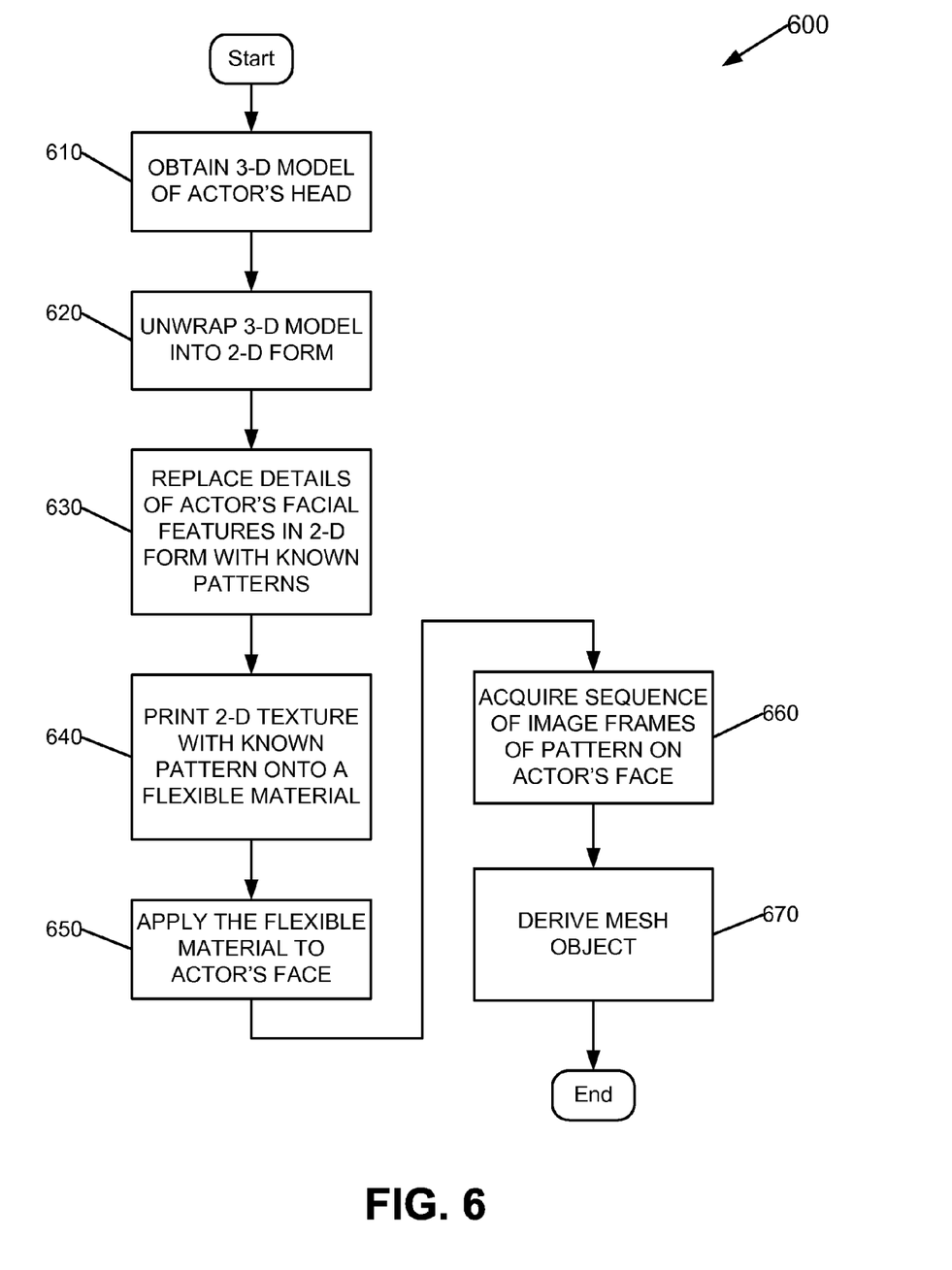
FIG. 6 is a flowchart describing a method of using a flexible marking material.

FIG. 6 is a flowchart describing a method of developing and using a flexible marking material 600 to generate animation data. In one implementation, the method utilizes temporary tattoos onto which known and/or identifiable random patterns are printed. First, a 3-D model of the actor's head is obtained, at 610. The model may be obtained, for example, using laser scanning to generate a texture map. Next, the 3-D model thus obtained is unwrapped into 2-D form, at 620, such as by unwrapping the face texture generated by the laser scan. Details of the actor's facial features are replaced in the 2-D form (e.g., the texture map) with at least one known pattern, at 630. In an alternative implementation, a printed grid is included with the known pattern. The grid functions as a primary marker pattern and the known pattern as a secondary marker pattern to facilitate labeling the grid vertices. That is, the grid is advantageously uniform for facilitating an accurate digital model (i.e., mesh object) of the target surface. But, because of the inherent uniformity of the grid, it is also difficult to track because the grid vertices are difficult to identify individually. A known pattern of markers applied over the grid may be used as a secondary reference to aid in resolving the (primary) grid vertices.

The 2-D texture map with the known pattern is then printed onto a flexible material, at 640. In one implementation, the flexible material includes a temporary tattoo paper. Generally, any flexible and/or transparent material will suffice. The flexible material (e.g., the temporary tattoo paper) with the printed pattern is applied to the actor's face, at 650. Each actor performing in a scene typically receives a unique pattern.

In another implementation, if movements of the actor's face are too restricted with the temporary tattoo on it, the face tattoo can be divided into smaller sections applies as separate tattoos.

A sequence of image frames is acquired next, at 660, according to methods and systems for motion capture described above in relation to FIG. 1. Once captured, the image data are used to reconstruct one or more mesh objects (i.e., 3-D model) representing the actor or object equipped with the markers, at 670.

In one implementation, the temporary tattoo may be printed with glow-in-the-dark ink. A motion capture scheme using shuttered light and dark cameras may then be used to record the pattern on the tattoo. In other implementations, markers utilizing ultra-violet or infra-red light, or retro-reflective materials may be used.

Various illustrative implementations of the present invention have been described. However, one of ordinary skill in the art will recognize that additional implementations are also possible and within the scope of the present invention. For example, although the lighting information handling in the surface capture system has been described generally as it relates to mesh objects, lighting information can also be extracted from the mesh objects because they include a texture that was recorded at the time of recording. In one implementation, the texture is wrapped around the mesh per frame object on a frame-by-frame basis.

It will be further appreciated that grouping functionalities within a module or block is for ease of description. Specific functionalities can be moved from one module or block to another without departing from the invention.

Accordingly, the present invention is not limited to only those embodiments described above.

What is claimed is:

1. A method, comprising:
    covering a surface with a pattern formed of a marking material including material which operates in both dark and light lighting conditions to provide texture and lighting of the surface;
    acquiring a sequence of image frames, each image frame of the sequence including a plurality of images of the pattern covering the surface,
    wherein the plurality of images of the pattern is formed as a random pattern to capture motion and geometry of the surface;
    deriving a mesh object from the plurality of images for the each image frame;
    tracking a plurality of vertices of the mesh object in each image frame through the sequence of image frames; and
    generating animation data modeling characteristics of the surface including the texture and lighting using the tracked plurality of vertices of the mesh object.

2. The method of claim 1, wherein the marking material conforms to the surface.

3. The method of claim 1, wherein the mesh object models the surface.

4. The method of claim 1, wherein the mesh object is defined by the plurality of vertices.

5. The method of claim 1, wherein the animation data include
    labeled marker data in the form of at least one of: skeleton data, FACS animation curves, and shape animation.

6. The method of claim 1, wherein the surface includes a surface of a person.

7. The method of claim 1, wherein the marking material includes at least one of quantum nanodot material and fluorescent material.

8. The method of claim 1, wherein the marking material includes at least one of infra-red ink, infra-red paint, ultra-violet ink, ultra-violet paint, and glow-in-the dark substance.

9. A system, comprising:
    an image acquisition module configured to generate a sequence of image frames, each image frame including a plurality of synchronized images of a pattern disposed on a surface with a marking material including material which operates in both dark and light lighting conditions to provide texture and lighting of the surface, and
    wherein the plurality of synchronized images of the pattern is formed as a random pattern to capture motion and geometry of the surface; and
    a surface capture module configured to receive the sequence of image frames and generate animation data based on the pattern disposed on the surface,
    said surface capture module comprising:
    a mesh derivation module configured to receive the sequence of image frames and generate at least one sequence of mesh objects; and
    a tracking module configured to receive and track a plurality of vertices of the at least one sequence of mesh objects, and to generate the animation data modeling characteristics of the surface including the texture and lighting using the tracked plurality of vertices.

10. The system of claim 9, wherein said at least one sequence of mesh objects includes
a mesh object generated for each image frame of the sequence of image frames.

11. The system of claim 10, wherein said mesh object generated for each image frame is defined by a plurality of vertices.

12. The system of claim 11, wherein said tracking module includes
a facial action coding system ("FACS") cleaning subunit configured to analyze spatial displacements of at least one vertex of said plurality of vertices according to pre-defined constraints.

13. The system of claim 10, wherein said tracking module includes
a topography subunit configured to generate tracking information by recognizing at least one topographical feature of one mesh object and tracking the at least one topographical feature through said at least one sequence of mesh objects.

14. The system of claim 10, wherein said tracking module includes
a texture tracking subunit configured to generate tracking information by tracking a textural feature of one mesh object through said at least one sequence of mesh objects.

15. The system of claim 9, wherein said tracking module includes
a kinematic skeleton subunit configured to generate tracking rules based on skeletal model information.

16. A non-transitory computer-readable storage medium for storing a computer program, the program comprising executable instructions that cause a computer to:
acquire a sequence of image frames, each image frame of the sequence including a plurality of images of a pattern covering a surface, and the pattern is formed of a marking material including material which operates in both dark and light lighting conditions to provide texture and lighting of the surface, and
wherein the plurality of images of the pattern is formed as a random pattern to capture motion and geometry of the surface;
derive a mesh object from the plurality of images for the each image frame;
track a plurality of vertices of the mesh object in each image frame through the sequence of image frames; and
generate animation data modeling characteristics of the surface including the texture and lighting using the tracked plurality of vertices of the mesh object.

17. The non-transitory computer-readable storage medium of claim 16, wherein the mesh object is defined by a plurality of vertices.

18. The non-transitory storage medium of claim 16, wherein the executable instructions that cause the computer to track the mesh object includes executable instructions that cause the computer to
recognize a topographical feature of the mesh object.

19. A method, comprising:
obtaining a 3-D model of an actor's head;
unwrapping the 3-D model into a 2-D texture;
replacing the details of the actor's facial features represented in the 2-D texture with a random pattern to capture motion and geometry of the facial features;
printing the 2-D texture with the random pattern onto a flexible material,
wherein the flexible material includes material which operates in both dark and light lighting conditions to provide texture and lighting of the surface;
applying the flexible material to the actor's face;
acquiring a sequence of image frames, each image frame of the sequence including a plurality of images of the random pattern covering the actor's face;
deriving a mesh object representing the actor's face from the sequence of image frames; and
tracking vertices of the mesh object in each image frame of the sequence of image frames.

20. The method of claim 19, wherein the flexible material includes temporary tattoo paper.

21. The method of claim 19, wherein the flexible material includes a transparent material.

22. The method of claim 19, wherein obtaining a 3-D model of the actor's head includes performing a laser scan of the actor's head.

* * * * *